Sept. 16, 1969   S. B. F. CARLSTEDT   3,466,978
PRESSURE RELAY

Filed Sept. 12, 1966   4 Sheets-Sheet 1

INVENTORS
SVEN BORJE
FREDRIK CARLSTEDT
BY

*Greer Maréchal, Jr.*
ATTORNEY

Sept. 16, 1969  S. B. F. CARLSTEDT  3,466,978
PRESSURE RELAY

Filed Sept. 12, 1966  4 Sheets-Sheet 3

INVENTORS
SVEN BORJE
FREDRIK CARLSTEDT
BY
Greer Maréchal, Jr.
ATTORNEY

Sept. 16, 1969   S. B. F. CARLSTEDT   3,466,978
PRESSURE RELAY
Filed Sept. 12, 1966   4 Sheets-Sheet 4

INVENTORS
SVEN BORJE
FREDRIK CARLSTEDT
BY

ATTORNEY

United States Patent Office 3,466,978
Patented Sept. 16, 1969

3,466,978
PRESSURE RELAY
Sven Borje Fredrik Carlstedt, Stockholm, Sweden, assignor to Stenberg-Flygt AB, Solna, Sweden, a corporation of Sweden
Filed Sept. 12, 1966, Ser. No. 578,868
Int. Cl. F15b 15/10; H01h 35/34
U.S. Cl. 92—95                                              12 Claims

ABSTRACT OF THE DISCLOSURE

A pressure relay device is provided for operation over a large range of pressures from a preset high pressure to a preset low pressure of substantially the prevailing atmospheric pressure and operable so as to maintain the preset high pressure position once attained until such time as the preset low pressure is sensed by said device when the low pressure position is taken instantaneously. The device includes a substantially nonflexible diaphragm one side of which is connected to the source of the pressure being sensed and movable between a high pressure and a low pressure position in planes substantially parallel to it and to each other and cooperating with an annular flange adjacent said high pressure position which reduces the effective cross-section of said diaphragm upon movement from said low pressure position to said high pressure position for maintaining said high pressure position throughout the entire range of pressures being sensed from the said preset high pressure being sensed to the said preset low pressure being sensed. In addition, an adjustable spring-biased backing member is positioned adjacent said diaphragm and movable therewith, with said spring bias being arranged to provide the strongest bias at said low pressure position for maintaining said diaphragm in said low pressure position throughout the entire range of preset pressures being sensed until said preset high pressure is reached for instantaneous movement of said diaphragm and said backing member to said high pressure position, said spring bias gradually being reduced during said movement.

This invention relates to a pressure relay.

More particularly this invention relates to a pressure relay of the type provided with a diaphragm forming one wall of a chamber intended to be connected with a liquid or gaseous medium whose pressure is to be controlled. Further the pressure relay is of a kind wherein a variable spring pressure or some other variable mechanical back pressure acts on the diaphragm, on its external side exposed to the atmospheric pressure. In addition, the external side of the diaphragm coacts with at least one shoulder with which the diaphragm is displaced into engagement in order to reduce the free diaphragm area when the pressure of the medium acting on the diaphragm has increased from a certain low to a certain high value. By this switching of the diaphragm also the back pressure decreases.

The two pressure levels between which the relay operates may be represented by a certain maximum and a certain minimum water level in a reservoir, the relay then actuating a pump so as to start the same when the high water level has been reached, the pump remaining in operation until the low water level has been reached. The invention is primarily directed towards such cases of control when one of the pressures is close to the atmospheric pressure so that the pressure difference between the two sides of the diaphragm is insignificant. Such cases of control involve specific complications when the ratio between the higher and the lower pressure value becomes great, so the pressure relay is thus to be capable of emitting an impulse at the comparatively high pressure as well as at the essentially lower pressure and to stand by between these levels. Hence, it is one main feature of the invention to provide a pressure relay which is capable of covering a comparatively wide pressure differential range and which in addition, is of a simple construction and distinguished by a small diaphragm movement.

Another object of the invention is to provide an impulse member for a pressure relay of the type in consideration which is adapted to occupy various positions against the action of a variable back pressure and in which the variable back pressure is produced by simple but exactly operating and reliable means.

Further objects and advantages of the invention will become apparent from the following description, considered in connection with the accompanying drawings, which form part of this specification and of which:

Figure 1:
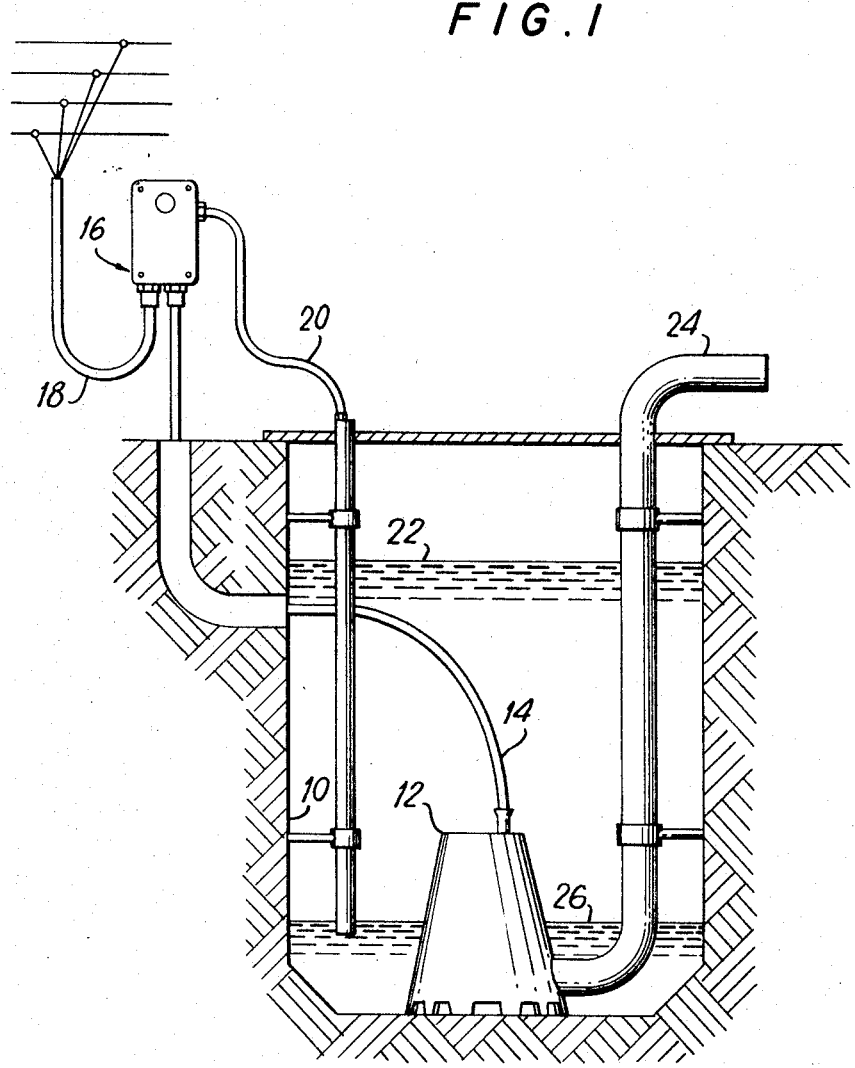
FIG. 1 is a vertical section through a drainage well provided with a pump and a relay in accordance with the invention.

Referring now to FIG. 1, reference numeral 10 designates a drainage well received in the ground and wherein subsoil water, rain water or the like is collected. In the well there is disposed a pump 12 which connects through a cable 14 with a pressure relay provided in accordance with the invention and generally designated 16. Said relay connects through a cable 18 with a 3-phase power supply. Further a pipe 20 extends down into the well, the interior of said pipe being exposed to a pressure varying in dependence of the water level in the well. When said level reaches a certain maximum value in accordance with the level line 22, the pump starts and removes the water from the well through a conduit 24. This condition prevails until a water level 26 has been reached in the well, which level is closely above the lower opening of the pipe 20. This means that upon reaching the level 26 the pressure in the pipe 20 is very low, suitably only a few centimeters of water over the atmospheric pressure. Thus the pump starts as soon as the liquid level has reached the value 22 and remains in operation until the lower level 26 has been reached. The difference between the two levels may amount in practice to 1.5 meters and more. From this it will be appreciated that the ratio between maximum and minimum water pressure in the pipe 20 will be great.

The casing of the pressure relay 16 is divided into two parts, one lower 28 and one upper 30. The lower part has a protuberance 31 with an annular shoulder 32 engaged by the peripheral portion of a circular diaphragm 34. Inside of the shoulder 32 the protuberance forms a chamber 36 having the same pressure as the pipe 20 and actuated by the water level in the well according to the above.

The diaphragm 34 is such that its free circular portion inside of the shoulder 32 is movable perpendicularly to its face. However, at the same time the diaphragm is essentially inextensible in its own plane. Preferably it is made of a nonmetallic material, such as a fabric-reinforced sheet of Teflon. To bring about a complete seal a thin rubber diaphragm 35 may be interposed below the diaphragm 34. Thus the diaphragm 35 is resilient and its position is completely determined by the diaphragm 34. The latter may have a central vent hole 37. Also rubber may be contemplated for the diaphragm 34 provided that it is reinforced in its plane so as not to be extensible in this direction to any appreciable extent.

On the shoulder 32, concentrically with the same, an annulus 38 is disposed whose inner periphery 40 lies within the inner edge of the shoulder 32. This means that if such a positive pressure is developed in the chamber 36 that the free inner portion of the diaphragm 34 is displaced upwards, this portion will engage the annulus 38 so that the free area of the diaphragm becomes smaller than before. In order to impart to the relaxed diaphragm area a sharp border line the annulus 38 may be provided with an annular recess 42 close to the inner periphery 40. The annulus 38 may be of an electrically insulating material.

A backing member 44, suitably in the form of a circular disc, enters with a certain play into the internal opening of the annulus 38 and rests on the diaphragm 34, the backing member suitably having a somewhat projecting edge portion 46 which primarily engages the diaphragm. The backing member 44 is restrictedly movable away from the chamber 36 when the diaphragm 34 is displaced upwardly under the action of a certain pressure reached in the chamber 36. This limitation of the movement may be caused by a shoulder 48 of the backing member striking a shoulder 50 on a plate 52 of electrically insulating material covering the protuberance 31. The backing member 44 has a central pin 54 passing through a bushing 56 in the plate 52 and, outside said plate, actuated by a spring 58 retained on the plate 52 by means of a knob 60 and a screw 62. The spring 58 is of such a nature that it exerts a pressure on the pin 54 and thus on the backing member 44 which is opposing the pressure in the chamber 36. In addition, the spring is disposed in such a manner that its action on the backing member 44 decreases as the latter moves away from the chamber 36. In the embodiment shown the spring 58 is a leaf spring and its end portion is bent upwards. Hence, in the transmission of force that component which actuates the pin 54 in its longitudinal direction becomes essentially smaller when the pin 54 moves out of the plate 52, at the same time as the bending angle of the leaf increases further.

The relay further includes a thermal trigger 64 and a contactor 66.

Above the backing member 44 two resilient arms 68, 70 are mounted whose end portions are brought into contact with one another and close a current circuit through the trigger and the contactor when the higher pressure value is reached in the chamber 36 and the diaphragm 34 moves. Upon this circuit being closed the pump motor 12 starts. Two other contact arms 72, 74 are also brought into contact upon the diaphragm moving. This pair of contacts controls an alarm.

Figure 2:
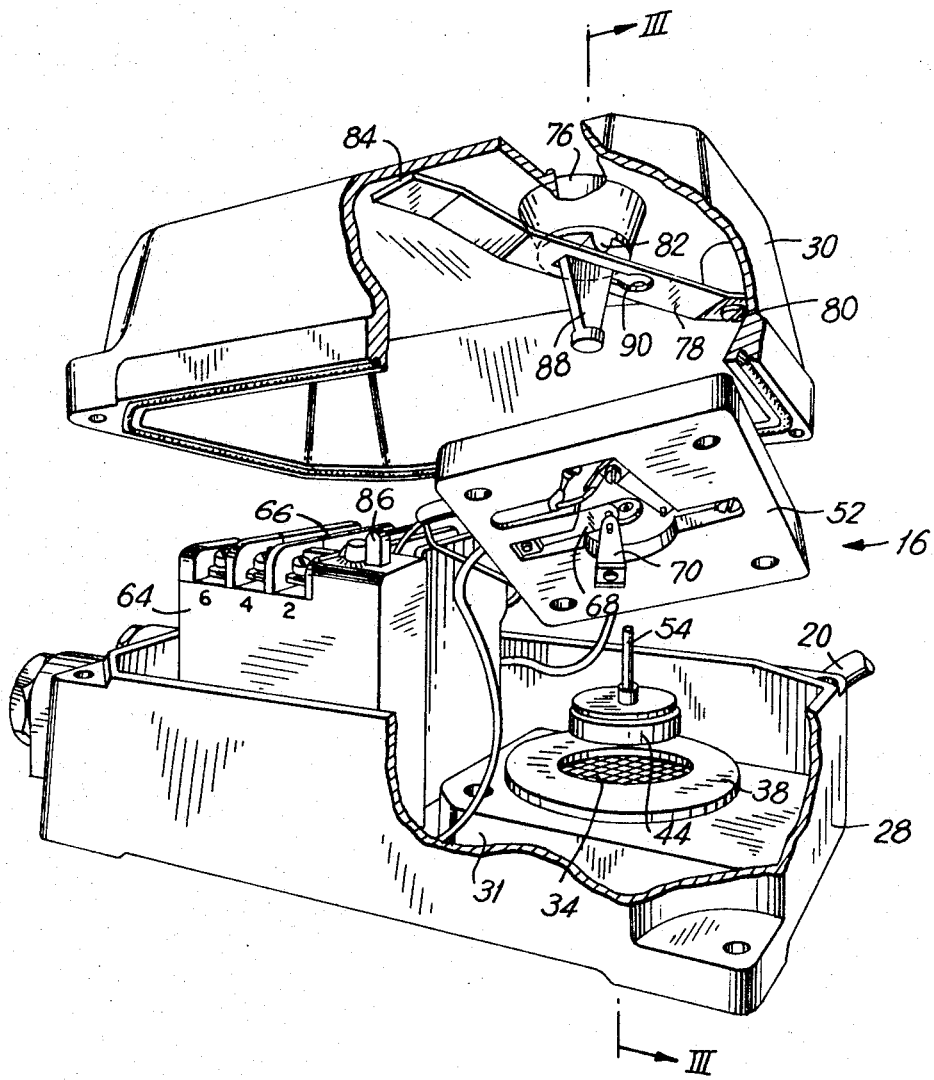
FIG. 2 is an exploded view in perspective of this relay.

A contact push button 76 actuable from outside is maintained in a neutral or initial position by a leaf spring 78. This spring is secured to the upper part 30 of the casing by means of a screw 80. The button 76 is suitably provided with two elongated projections 82 extending across the longitudinal direction of the leaf spring and by means of which the button engages the spring. The leaf spring 78 has an end portion 84 cooperating with a reset button 86 in the thermal trigger. The button 76 has an extension 88 passing through an aperture 90 (FIG. 2) in the leaf spring and which is adapted to cooperate with a peg 92 extending through the plate 52 to the contact arm 68. By pressing the button 76 the trigger 64 is first brought into operation, after which contact is established between the arms 68 and 70.

Figure 3:
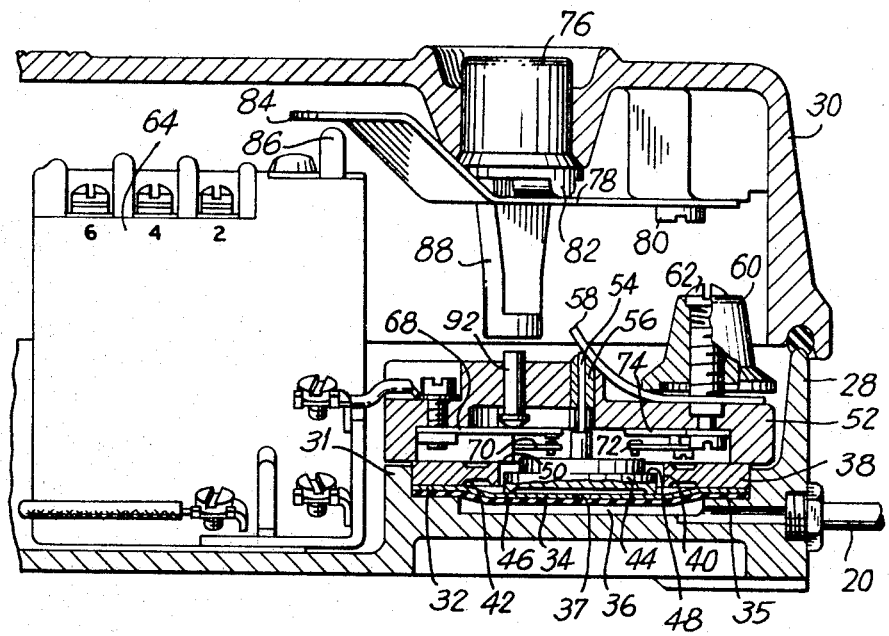
FIG. 3 is a cross section along line III—III in FIG. 2 and drawn on a larger scale.

The device operates in the following way. Assume first that the water level in the well 10 is at the position 26. The pressure in the chamber 36 is then low, for instance, only a few centimeters of water. The diaphragm 34 assumes the position according to FIG. 3 and the contact arms 68 and 70 are separated. This means that the pump 12 is out of operation. As the water level then rises and finally reaches the level 22, the pressure in the chamber 36 will be increased in correspondence to the difference between levels 22 and 26. Then a pressure acts on the diaphragm 34 which is sufficient to overcome the opposing pressure exerted by the spring member 58. The consequence is that the diaphragm 34 will move the backing member 44 until the shoulder 48 strikes the shoulder 50, and at the same time the contact arm 70 makes contact with the contact arm 68 so that the pump motor is energized by way of the contactor 66. By the spring member 58 having a characteristic of such a nature that its opposition, exerted over the pin 54, against the movement of the backing member 44 decreases steeply, the switching of the backing member takes place instantly so that arc formation between the contact arms is eliminated. Upon the backing member 44 abutting the shoulder 50, the diaphragm will also contact the inner periphery 40 of the annulus 38. Therefore, the free area of the diaphragm decreases in correspondence to the difference between the diameter of the chamber 36 and that of the inner periphery 40 of the annulus. The upwardly directed pressure exerted by the diaphragm decreases in correspondence to the free area of the diaphragm before and after the displacement, but at the same time, as previously mentioned, the spring force acting on the backing member 44 has decreased. The oppositely directed forces are so selected that the pressure in the chamber 36 predominates until it has fallen to the lower value corresponding to the water level 26. The spring 58 will then preponderate and the backing member 42 is displaced downwards instantly to the position of FIG. 3, the current then being broken. However, the resistance offered by the diaphragm against the above mentioned displacement is not only related to the pressures prevailing on either side of the diaphragm but also to the adherence acting between the diaphragm and annulus 38. It is characteristic to the invention that this force of adherence is utilized completely to block the diaphragm movement and thus to prevent breaking of the contacts 70 and 68 until a next to complete equalization of pressure has taken place between the two sides of the diaphragm 34, that is, the pressure in the chamber 36 is in the neighborhood of atmospheric pressure or that obtaining at level 26. This is accomplished thanks to a series of features characteristic to the invention.

As previously mentioned the backing member 44 enters into the interior of the annulus 38 with very little play, and, therefore, the displacement of the backing member by the spring 58 is transmitted to the diaphragm across essentially the entire diminished diaphragm surface adjacent the whole inner periphery 40 of the annulus 38.

The diaphragm 34 is easily movable in the direction of motion of the backing member 44 but, on the other hand, it has practically no elasticity. Thus the resistance of the diaphragm against the displacement of the backing member stops at the same time as said member reaches a precise final position, thanks to the shoulder 50. The diaphragm 35 has a sealing function exclusively and follows without resistance the movements of the other diaphragm.

The recess 42 in the annulus 38 has the effect that the diaphragm 34 is stretched across the whole periphery 46 which, after the pressure level in 36 is reduced, together with the increasing influence of the spring 58 contributes to an instant breaking of the contacts 68–70 with no sparking.

As the diaphragm 34 is not connected to the backing member 44 it is allowed, during its travel towards contact closing, to bulge across its whole effective area. In breaking the contacts, on the other hand, the movability of the diaphragm is limited to that permitted by the diaphragm surface corresponding to the difference in area between the surfaces of the chamber 36 and the backing member which face the diaphragm. This difference in diaphragm movement together with the above mentioned blocking of the diaphragm after the backing member has been stopped against the shoulder 50 makes setting possible within a comparatively large pressure differential range by means of a relatively small spring force.

Figure 4:
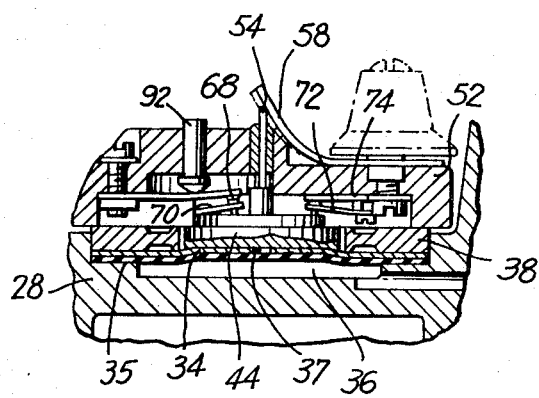
FIG. 4 shows a portion of the relay in the same cross section as in FIG. 3 but with the diaphragm and components actuated thereby assuming another position; and, finally.
Figure 5:
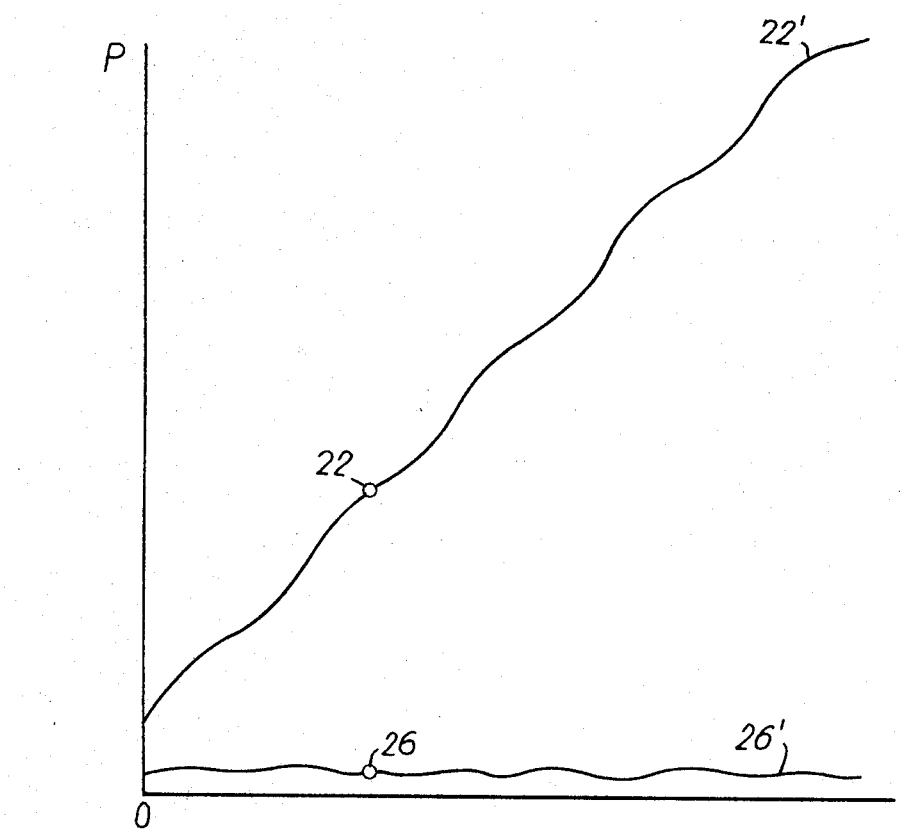
FIG. 5 is a diagram showing curves on various settings of the relay.

The level 22 is set by the tension of the spring 58 being increased or decreased by means of the knob 60. In the initial position of spring 58 (FIG. 3) a greater or smaller force is transmitted to the backing member 44. This back pressure decreases gradually during the movement of the backing member from the chamber 36 to reach its lowest value in the blocking position (FIG. 4). Beyond this position irrespective of the setting, the force transmitted by the setting device in the blocking position will be practically constant. Because of this, the adjustability will not only cover a large range but the two pressures 26 and 22 may be set by means of one adjustment member only. In the diagram of FIG. 5 points 26 and 22 represent the pressures P in the chamber 36 on the levels shown in FIG. 1. The curves 26' and 22' show how the levels vary as a function of the setting of the knob 60 in various positions. The abscissa axis then indicates the tension of the spring 58. One will find that the curve 26' extends practically parallel to the abscissa axis while, on the other hand, the curve 22' raises steeply.

The pump may also be adapted to supply liquid to the well. The levels need not be maintained by means of a pumping unit but the relay may control the flowing in and out by means of one or more power operated valves. The invention is not confined to level control but is directed to all intermittent pressure control ranges where one of the limit values represents the atmospheric pressure or thereabout, as in gas pressure and draught contol, maintaining subatmospheric pressure in premises, etc.

While one more or less specific embodiment of the invention has been shown and described, it is to be understood that this is for purpose of illustration only, and that the invention is not to be limited thereby.

What I claim is:

1. Pressure relay apparatus of the character described for controlling the pressure of a fluid and having a casing defining a chamber, a diaphragm forming one wall of said chamber, a source of pressure fluid to be controlled, and a pressure fluid conduit providing flow communication between said chamber and said source, the combination which comprises variable mechanical back pressure means acting on said diaphragm and disposed adjacent said diaphragm on the side thereof opposite said chamber with said side being exposed to atmospheric pressure, and said mechanical back pressure means being arranged to reduce said back pressure as said diaphragm moves away from said chamber towards its high pressure position, a shoulder disposed adjacent said mechanical back pressure means and spaced from said diaphragm and configured for reducing the effective cross-section of said diaphragm exposed to atmospheric pressure when said diaphragm moves into engagement therewith, and adjusting means connected to said mechanical back pressure means for determining the amount of pressure from said source necessary for moving said diaphragm against the action of said mechanical back pressure means from a low pressure position to a high pressure position in engagement with said shoulder.

2. Apparatus as described in claim 1 in which said mechanical back pressure means includes a biasing spring and a backing member for bearing against said diaphragm configured for sliding fit within the confines of said shoulder with the periphery thereof spaced from the inside edge of said shoulder to provide flow communication to atmospheric pressure therebetween.

3. Apparatus as described in claim 2 in which the sides of said backing member and said shoulder facing said diaphragm are configured to provide a certain degree of adhesion with respect to said diaphragm in the high pressure position thereof to maintain said high pressure position through the entire range of pressures being sensed until a preset low pressure is sensed by said relay.

4. Apparatus as described in claim 3 in which the said configurations are annular peripheral projections.

5. Apparatus as described in claim 1 which includes electrical contact means operated by said backing member and a shoulder disposed adjacent the high pressure position of said backing member for providing a precise stop for the said backing member and the said diaphragm when the preset high pressure has been sensed, with said electrical contact means being activated when said backing member moves against said shoulder.

6. The pressure relay of claim 1, characterized in that said shoulder has an annular configuration.

7. The pressure relay of claim 1, characterized in that the diaphragm is made of a thin sheet-like material having no appreciable resilience in any direction and being essentially inextensible in its facial direction.

8. The pressure relay of claim 1, characterized in that the diaphragm consists of a cord reinforced plastic material.

9. An impulse member for regulators having a fluid pressure responsive feeler movable into different positions against a variable spring bias, the combination which comprises a support, a bushing, a stop on said feeler, and a leaf spring member extending between said support and said stop and bent against said bushing to provide a component of force against said feeler in the direction of movement thereof, with said force being reduced in direct relationship to the movement of said feeler toward said spring.

10. The impulse member of claim 9, characterized by said support having an adjustment member adapted to control the degree of bending out of the spring member between the feeler and a place of attachment of said spring member on said support.

11. The impulse member of claim 10, characterized by said adjustment member being pivotable about a center, the support being formed in part by a circumferential edge on said adjustment member formed at a distance from said center.

12. The impulse member of claim 10, characterized by the feeler having a starting position and a fixed final position, the bending of the spring member being greater in the latter position for reaching a value whereby the pressure component acting on the feeler in the direction of movement of the latter becomes constant independent of the degree of tension produced by the adjustment member.

References Cited

UNITED STATES PATENTS

| 708,155 | 9/1902 | Meloon | 200—83.5 |
|---|---|---|---|
| 851,691 | 4/1907 | Newell | 200—83.5 |
| 1,626,673 | 5/1927 | Farmer | 92—101 X |
| 2,358,732 | 9/1944 | Otto | 200—83.2 X |
| 2,614,903 | 10/1952 | Stamper et al. | |
| 2,615,102 | 10/1952 | McMath | 200—83.91 X |
| 2,777,029 | 1/1957 | Langstroth | 200—83.2 |
| 2,998,343 | 8/1961 | Gold et al. | 92—103 X |
| 2,424,511 | 7/1947 | Stanley et al. | 74—522 |
| 2,824,919 | 2/1958 | Davis | 92—95 X |
| 3,141,389 | 7/1964 | Currie | 92—95 |

MARTIN P. SCHWADRON, Primary Examiner

I. C. COHEN, Assistant Examiner

U.S. Cl. X.R.

92—5, 101, 130, 133; 200—83; 267—1